J. SKRZYCKI.
WORK HOLDER.
APPLICATION FILED MAR. 19, 1920.
1,356,889.
Patented Oct. 26, 1920.
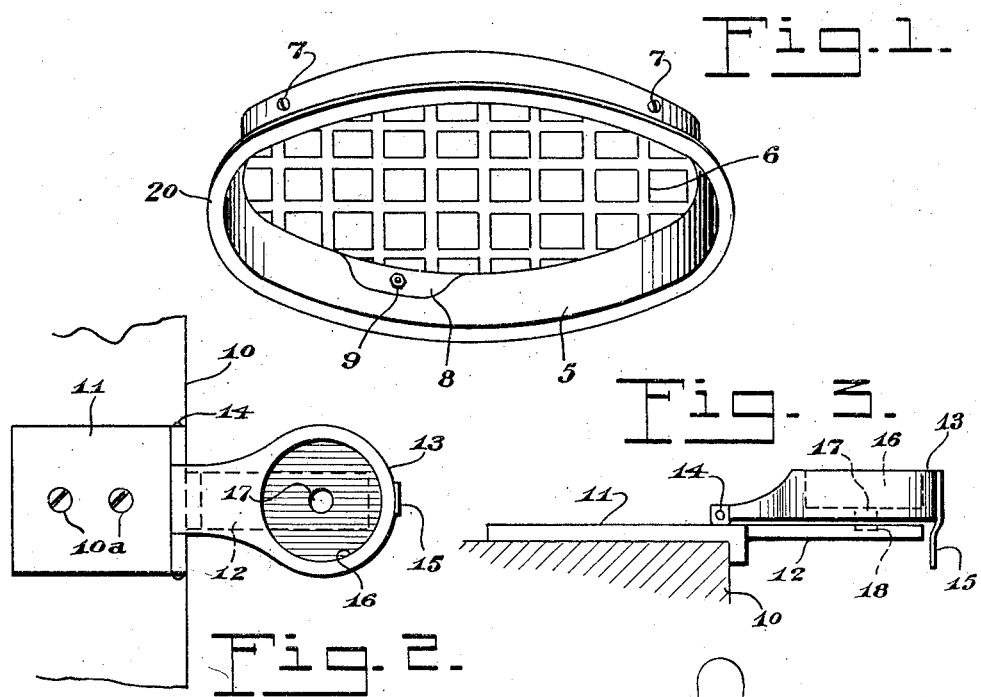
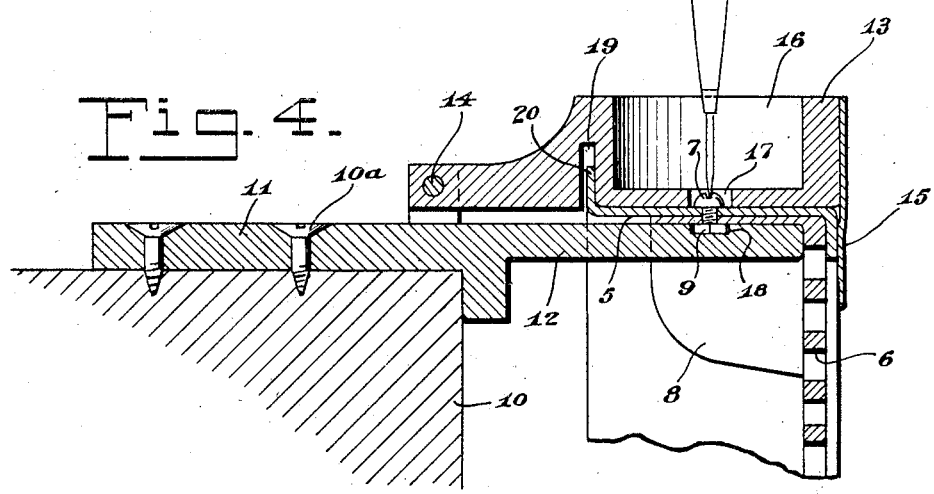
John Skrzycki. INVENTOR.
BY
ATTORNEYS.

UNITED STATES PATENT OFFICE.

JOHN SKRZYCKI, OF CHICAGO, ILLINOIS.

WORK-HOLDER.

1,356,889.   Specification of Letters Patent.   Patented Oct. 26, 1920.

Application filed March 19, 1920. Serial No. 367,277.

*To all whom it may concern:*

Be it known that I, JOHN SKRZYCKI, a citizen of the United States, residing at Chicago, in the county of Cook and State of Illinois, have invented new and useful Improvements in Work-Holders, of which the following is a specification.

The work holder which is the subject matter of the present application for patent has been designed to facilitate the driving of screw bolts, and also to provide a guard for preventing marring of the surface of the article to which the screw bolt is applied, in the event of slippage of the screw driver.

The device is especially useful in assembling highly polished parts, and it has been designed more particularly for assembling the parts constituting the grid of an electric cooking appliance, although it may with slight modifications be used for assembling other parts.

In order that the invention may be better understood, reference is had to the accompanying drawing forming a part of this specification, and in said drawing, Figure 1 is a prespective view of the assembled grid; Fig. 2 is a plan view of the work holder; Fig. 3 is a side view thereof, and Fig. 4 is an enlarged cross-section of the device with the work in place, and showing the manner in which the device functions.

The article in connection with which the invention is used consists in a ring 5 which is nickeled and highly polished on the outside and supports a grid 6, the parts being fastened together by crew bolts 7 inserted from the outside of the ring. The grid has depending flanges 8 fitting in the ring and receiving the screw bolts, the latter being secured by nuts 9.

In order that the screw bolts 7 may be applied without danger of the screw driver marring the polished surface of the ring 5, there has been provided the work holder which is the subject matter of the present application for patent, and which will now be described.

The reference character 10 denotes a work bench or other supporting surface to which is fastened by screws or other suitable means 10ª the base 11 of the work holder, the same being a flat plate having a forward extension 12 of reduced width projecting from the work bench and forming a shelf for supporting the article to be operated on, as clearly shown in Fig. 4, the ring 5 being hung on said shelf so that one of the flanges 8 is positioned thereabove.

Above the shelf 12 is located a clamping head 13 hinged at 14 to the base 11 so that it may be swung down on the ring 5 to clamp the same to the shelf, and swung upwardly to release the ring after the screw 7 has been applied. That end of the ring 5 to which the grid 6 is applied is engaged by a spring clip 15 to assist in holding the ring steady.

The head 13 has a top recess 16 at the bottom of which is an aperture 17 positioned to leave the head of the screw bolt 7 exposed so that the screw driver may be applied thereto as shown in Fig. 4, the aperture being slightly larger than the bolt head. It will therefore be seen that the screw driver applied from above cannot get in contact with the ring 5 if it should slip, the surface of the ring adjacent to the bolt head being covered by the head 13.

In line with the aperture 17 the top of the shelf 12 has a recess 18 to seat the nut 9 and prevent the same from turning while the bolt 7 is being screwed home. The bottom of the head 13 has an upwardly extending slot 19 to seat an outstanding base flange 20 of the ring 5.

I claim:

1. A work holder comprising a support for the work, a clamping head pivoted to the support to swing over on top of the work, said head having an aperture exposing a portion of the work for access thereto, and a spring clip carried by the head and adapted to engage with the end of the work.

2. A work holder comprising a support for the work, a clamping head pivoted to the support to swing over on top of the work, said head having an aperture exposing a portion of the work for access thereto, and the support having a nut holding recess in line with the aforesaid aperture.

In testimony whereof I affix my signature.

JOHN SKRZYCKI.